(12) United States Patent   (10) Patent No.: US 7,760,238 B2
Giesen   (45) Date of Patent: Jul. 20, 2010

(54) VISION SYSTEM WITH DETERMINISTIC LOW-LATENCY COMMUNICATION

(75) Inventor: Robert J. B. Giesen, Austin, TX (US)

(73) Assignee: National Instruments Corporation, Austin, TX (US)

( * ) Notice: Subject to any disclaimer, the term of this patent is extended or adjusted under 35 U.S.C. 154(b) by 350 days.

(21) Appl. No.: 11/782,758

(22) Filed: Jul. 25, 2007

(65) Prior Publication Data

US 2009/0027509 A1   Jan. 29, 2009

(51) Int. Cl.
*H04N 5/232* (2006.01)
(52) U.S. Cl. ............................. 348/211.3; 348/211.11
(58) Field of Classification Search .............. 348/211.3, 348/211.11, 143
See application file for complete search history.

(56) References Cited

U.S. PATENT DOCUMENTS

| | | | |
|---|---|---|---|
| 6,556,241 B1 * | 4/2003 | Yoshimura et al. ...... | 348/211.11 |
| 6,697,105 B1 * | 2/2004 | Kato et al. ............. | 348/211.11 |
| 6,750,466 B2 | 6/2004 | Guha et al. | |
| 6,909,457 B1 * | 6/2005 | Fukasawa ............... | 348/211.11 |
| 6,988,008 B2 | 1/2006 | Hudson et al. | |
| 7,174,224 B2 | 2/2007 | Hudson et al. | |
| 7,254,512 B2 | 8/2007 | Odom | |
| 7,576,770 B2 * | 8/2009 | Metzger et al. ........ | 348/211.11 |
| 2002/0018124 A1 * | 2/2002 | Mottur et al. ................ | 348/211 |
| 2003/0025800 A1 * | 2/2003 | Hunter et al. .......... | 348/211.11 |
| 2003/0193571 A1 * | 10/2003 | Schultz et al. ......... | 348/207.99 |
| 2005/0090907 A1 | 4/2005 | Hudson et al. | |
| 2008/0164316 A1 * | 7/2008 | Patel et al. ............. | 235/462.43 |

OTHER PUBLICATIONS

Potra, Sorin and Sebestyen, Gheorghe, "EtherCAT Protocol Implementation Issues on an Embedded Linux Platform", 2006 IEEE International Conference on Automation, Quality, and Testing, Robotics, May 2006, vol. 1, pp. 420-425.*
Schuurman, Derek C., David W. Capson, "Real-Time Synchronized Vision Sensors Over Ethernet", Proceedings of the 29th Annual IEEE International Conference on Local Computer Networks, IEEE Computer Society, 2004, 8 pages.

* cited by examiner

*Primary Examiner*—Jason Whipkey
(74) *Attorney, Agent, or Firm*—Meyertons Hood Kivlin Kowert & Goetzel, P.C.; Jeffrey C. Hood; Mark S. Williams (57) ABSTRACT

Vision system and method. The system includes a vision system, including: a camera, a processor and memory, coupled to the camera, and an EtherCAT interface, coupled to the processor and memory, possibly contained in a chassis, and operable to couple to an EtherCAT network that provides for deterministic low-latency communication between the vision system and devices coupled to the EtherCAT network. The vision system may be configurable to operate as any of: an EtherCAT master device, an EtherCAT slave device, or a TCP/IP Ethernet device. One or more additional vision systems may couple to the EtherCAT network. The vision systems may be synchronized using an EtherCAT distributed clock technique, time-based triggered, and/or event triggered, via the EtherCAT network, e.g., in a multi-view vision, collaborative processing, control, I/O, or video servoing application, e.g., using an EtherCAT deterministic low latency closed loop feedback system, including processing, control, or I/O devices.

19 Claims, 10 Drawing Sheets

Fig. 6 provide one or more vision systems, each comprising a camera, a processor and memory, and each configured as an EtherCAT device, where the the one or more vision systems are each coupled to an EtherCAT network,
704 synchronizing the one or more vision systems via the EtherCAT network with a jitter less than equal to 1 microsecond using an EtherCAT distributed clock technique
706

VISION SYSTEM WITH DETERMINISTIC LOW-LATENCY COMMUNICATION

FIELD OF THE INVENTION

The present invention relates to the field of machine vision, and more particularly to a machine vision system with a deterministic low-latency interface.

DESCRIPTION OF THE RELATED ART

In many applications, machine vision systems are used to inspect or locate an object. For example, in manufacturing applications, machine vision may be used to detect defects in a manufactured object by acquiring images of the object and using various types of image processing algorithms to analyze the images. As an example, a system to manufacture electrical components such as capacitors may use machine vision to examine respective sides of the capacitors in order to detect manufacturing defects, ensure that the capacitors are labeled, marked, or color coded properly, etc.

As another example, a machine vision system may be used to inform and/or control a control device, such as a motion control device. For example, following the capacitor-manufacturing example above, a machine vision system may operate in conjunction with an actuator, e.g., a mechanical arm, to remove defective capacitors from the assembly line.

Current networked machine vision systems typically operate via relatively non-deterministic, high to medium latency transmission media and protocols, such as TCP/IP Ethernet, which have generally been sufficient due to the typical relatively low frequencies of machine vision operations. For example, in a typical machine vision/motion control system, the motion controller may operate in the microsecond domain, while the machine vision may operate in the millisecond domain. Many such prior art systems utilize various filtering, interpolation, or other processing schemes to compensate for this difference in performance time-scales.

However, as the characteristic frequencies of machine vision systems increase, e.g., due to faster processors, prior art transmission media and protocols may be inadequate for operation of vision systems, particularly in applications where cooperative operation between multiple devices is required.

SUMMARY OF THE INVENTION

Various embodiments of a system and method for machine vision are presented. The system may include a vision system, comprising: a camera, a processor and memory, coupled to the camera, and a low-latency deterministic Ethernet-based network interface, coupled to the processor and memory, and operable to couple to a low-latency deterministic Ethernet-based network. The low-latency deterministic Ethernet-based network may provide for deterministic low-latency communication between the vision system and devices coupled to the network. EtherCAT™ is an exemplary low-latency deterministic Ethernet-based network protocol that implements an Ethernet-based fieldbus protocol or system. The various embodiments disclosed herein are described in terms of an EtherCAT implementation. In various embodiments, the vision system may be an EtherCAT slave device, or an EtherCAT master device. In one embodiment, the vision system may be configurable to operate as any of: an EtherCAT master device, an EtherCAT slave device, or a TCP/IP Ethernet device.

The system may further include one or more additional vision systems, coupled to the EtherCAT network, and so the vision system and the one or more additional vision systems compose a plurality of vision systems. In various embodiments, the plurality of vision systems may be operable to be synchronized using an EtherCAT distributed clock technique, time-based triggered via the EtherCAT network, and/or event triggered via the EtherCAT network.

In one embodiment, the vision system comprises an EtherCAT master device, and each of the one or more additional vision systems comprises a respective EtherCAT slave device. In one embodiment, the plurality of vision systems may implement a multi-view vision application with respect to a target object, and where each of the one or more additional vision systems is operable to send vision data to the EtherCAT master device via the EtherCAT network. In another embodiment, the plurality of vision systems may be operable to perform collaborative processing with respect to a target object, wherein each of the one or more additional vision systems is operable to send vision data to the EtherCAT master device via the EtherCAT network.

In one embodiment, the system may include at least one EtherCAT device, coupled to the vision system via the EtherCAT network, where the vision system is operable to send data on the EtherCAT network for use by the at least one EtherCAT device to perform a control function. For example, the system may include an EtherCAT master device, coupled to the EtherCAT network, and one or more additional vision systems, coupled to the EtherCAT network. Thus, the vision system and the one or more additional vision systems may compose a plurality of vision systems. Each of the plurality of vision systems may be operable to send vision data to the EtherCAT master device, where the EtherCAT master device may be operable to generate control data based on the received vision data, and send the control data to the at least one EtherCAT device to perform a control function.

In one embodiment, the system may include at least one EtherCAT device, coupled to the vision system via the EtherCAT network, where the vision system may be operable to send data on the EtherCAT network for use by the at least one EtherCAT device to perform an I/O function.

In one embodiment, the system may include at least one EtherCAT motion control device, coupled to the vision system via the EtherCAT network. The vision system may be operable to: acquire images, determine motion control data based on information in the acquired images, deterministically send the motion control data to the at least one EtherCAT motion control device via the EtherCAT network to control the at least one EtherCAT motion control device to perform a portion of a motion control task, and repeat said acquiring, said determining, and said sending in an iterative manner to perform successive portions of the motion control task based on the information, thereby performing a visual servoing control loop with a frequency of 1 KHz or higher.

In one embodiment, the vision system may include or be a smart camera, including: the camera, the processor and memory, the EtherCAT interface, and a chassis, containing the camera, the processor and memory, and the EtherCAT interface.

In one embodiment, the system may include a plurality of vision systems, each comprising: a cameral, a processor and memory, coupled to the camera, and a network interface, coupled to the processor and memory, and operable to couple to a network, e.g., an EtherCAT network. A first vision system of the plurality of vision systems may comprise a master device, and others of the plurality of vision systems may comprise slave devices. The master device may be operable to place a frame on the network that includes data addressed to each of one or more of the slave devices. Each slave device may be operable to read the data addressed to the slave device and write data to the frame while the frame passes through the slave device.

In one exemplary embodiment, the system may implement a video servoing system. For example, the one or more EtherCAT motion control systems may be provided, each comprising an EtherCAT interface. One or more EtherCAT vision systems may also be provided, each comprising a camera, a processor and memory, and an EtherCAT interface, where the one or more EtherCAT motion control systems and the one or more EtherCAT vision systems are coupled to an EtherCAT network, composing a deterministic low latency closed loop feedback system, wherein the latency is less than or equal to 1 millisecond. The one or more EtherCAT vision systems may acquire images of a target object, and generate visual information based on the images. The one or more EtherCAT vision systems may send the visual information to a master EtherCAT device coupled to the EtherCAT network, which may compute motion control information based on the visual information, and send the motion control information to the one or more EtherCAT motion control systems. The one or more EtherCAT motion control systems may then operate according to the motion control information. The one or more EtherCAT vision systems acquiring images, the one or more EtherCAT vision systems sending the visual information, the master EtherCAT device sending the motion control information, and the one or more EtherCAT motion control systems operating, may implement a high frequency visual servoing control loop with an operating frequency greater than or equal to 1 Khz. The one or more EtherCAT vision systems acquiring images, the one or more EtherCAT vision systems sending the visual information, the master EtherCAT device sending the motion control information, and the one or more EtherCAT motion control systems operating, may be repeated in an iterative manner, to perform a visual servoing task.

Thus, various embodiments of the systems and methods disclosed herein may implement various deterministic, low-latency, vision systems.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 10/120,151 titled "Smart Camera With Modular Expansion Capability", filed Apr. 10, 2002.

U.S. patent application Ser. No. 10/090,482 titled "Scanning System and Method which Utilizes Continuous Motion Control and Data Acquisition Triggering", filed Mar. 1, 2002.

U.S. patent Ser. No. 10/809,107, titled "A Mixed Signal Analysis System and Method of Use", filed Mar. 25, 2004.

EtherCAT Specification IEC/PAS 62407, 2005-06.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

EtherCAT Vision Systems

As is well-known in the art of computer vision, a vision system generally includes a processor (or possibly multiple processors) and memory medium, and a camera, where the memory medium stores program instructions executable by the processor to perform any of various functions related to machine vision, e.g., signal or image acquisition and analysis, and in some applications, other functionality, e.g., motion control functions, and so forth. Such a vision system may be used alone, or may be included in a larger system, e.g., a multi-view vision system, a vision/machine control system, and so forth, as described below.

In embodiments of the present invention, one or more vision systems may include a low-latency deterministic Ethernet-based network interface for communicating via a low-latency deterministic Ethernet-based network, and may be coupled to a low-latency deterministic Ethernet-based network (e.g., bus), where the low-latency deterministic Ethernet-based network may provide for deterministic low-latency communication between each vision system and devices coupled to the network, e.g., other vision systems, motion control devices, etc. In other words, each vision system may be operable to communicate with devices on the low-latency deterministic Ethernet-based network deterministically with low latency (over the low-latency deterministic Ethernet-based network), using low-latency deterministic Ethernet-based protocols. EtherCAT™ is an exemplary low-latency deterministic Ethernet-based network protocol that implements an Ethernet-based fieldbus protocol or system. The various embodiments disclosed herein are described in terms of an EtherCAT implementation. For further information regarding EtherCAT, please see the EtherCAT Specification IEC/PAS 62407, 2005-06, which was incorporated by reference above. It should be noted that the embodiments described herein are intended to operate not only according to the current EtherCAT Specification, but any future versions, as well.

In some embodiments, a vision system may be an EtherCAT slave device. The EtherCAT slave device may be operable to receive commands from an EtherCAT master device over the EtherCAT network, and publish vision data on the EtherCAT bus for use by the one or more devices coupled to the EtherCAT network.

In other embodiments, a vision system may be an EtherCAT master device. The EtherCAT master device may be operable to send commands to, and receive data from, one or more EtherCAT slave devices over the EtherCAT network.

In preferred embodiments, a vision system may be configurable to operate as any of: an EtherCAT master device, an EtherCAT slave device, or a TCP/IP Ethernet device. In other words, the vision system may operate as any of these kinds of devices based on configuration. This configuration may be performed manually, e.g., by a human operator, or automatically, e.g., by an external device, during manufacture (e.g., a default configuration), or by the vision system itself, e.g., in response to specified conditions or a specified schedule.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., applications where signals and/or other data are acquired, produced, and/or analyzed, as well as general purpose software applications such as word processing, spreadsheets, network control, network monitoring, financial applications, games, etc.

Below are described vision systems according to various embodiments of the present invention. It should be noted that the particular vision systems and applications described are meant to be exemplary only, and are not intended to limit the invention to any particular application domain, appearance, or functionality.

Figure 1A:
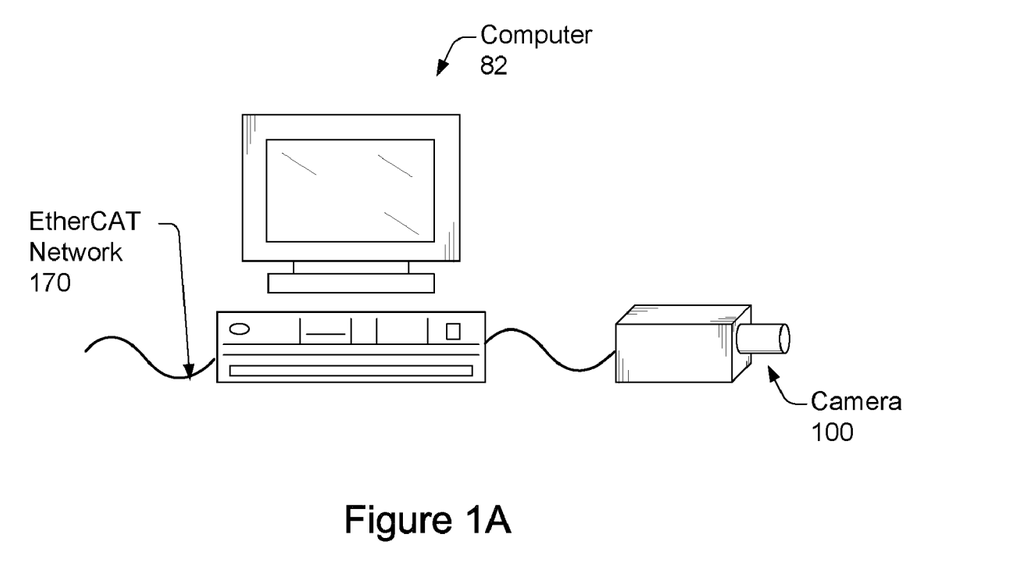
FIG. 1A illustrates a vision system, according to an embodiment of the present invention.

FIG. 1A—Computer System

FIG. 1A illustrates a vision system comprising a computer system 82 and a camera 100. Embodiments of a camera with a high-speed interface are described below. It should be noted that embodiments of the cameras described herein may be used for any purposes desired, e.g., generation, acquisition, and/or analysis of data (including signals), e.g., for measurement, testing, control, design, prototyping, and so forth.

The computer system 82 may include one or more processors, and at least one memory medium on which one or more computer programs or software components according to one embodiment of the present invention may be stored. For example, the memory medium may store various programs that are executable by the one or more processors to perform the methods described herein. Additionally, as indicated above, the memory medium may store a development environment application used to create and/or execute or operate measurement applications, e.g., signal analysis, vision, and/or motion control applications. The memory medium may also store operating system software, as well as other software for operation of the computer system. Various embodiments further include receiving or storing instructions and/or data implemented in accordance with the foregoing description upon a carrier medium.

The vision system may be operable to be coupled to an EtherCAT network 170, e.g., via an EtherCAT network interface that may be comprised in the computer 82.

As shown in FIG. 1A, the computer system 82 may include a display device operable to display a graphical user interface for operation of embodiments of the present invention, including, for example, a development environment for designing and creating measurement applications. Note that the graphical user interface may comprise any type of graphical user interface, e.g., depending on the computing platform. In one embodiment, the measurement application may include a signal analysis application, and the development environment may include a signal analysis system, such as Signal Express™, provided by National Instruments Corporation. Further details regarding such a signal analysis system may be found in U.S. patent Ser. No. 10/809,107, titled "A Mixed Signal Analysis System and Method of Use", which was incorporated by reference above. In some embodiments, the measurement application may include a vision application, and possibly a motion control application, and the development environment may include vision and/or motion control development environments. In other embodiments, the memory medium may store any kind of software desired.

Figure 1B:
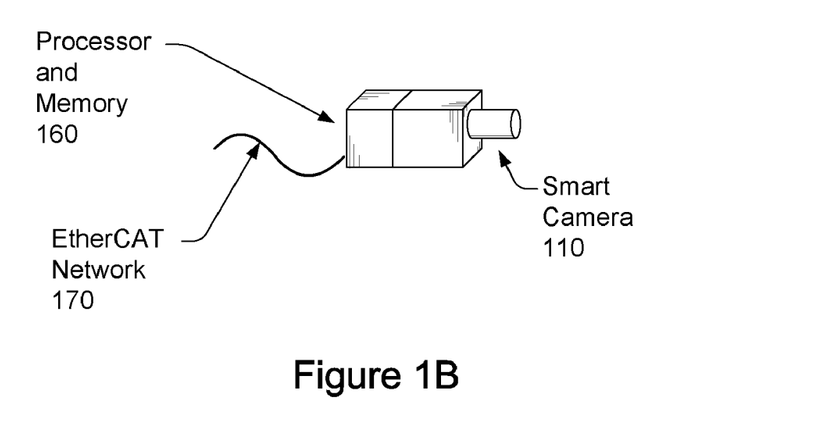
FIG. 1B illustrates a smart camera implementation of a vision system, according to one embodiment of the present invention.

FIG. 1B—Smart Camera

FIG. 1B illustrates a vision system where the processor and memory are incorporated in a smart camera 110, i.e., where the smart camera includes the camera, the processor and memory, and a chassis, containing the camera and the processor and memory. In other embodiments, in addition to, or instead of, the processor, the smart camera may include a programmable hardware element, e.g., a field programmable gate array (FPGA), an application specific integrated circuit (ASIC), etc.

It should be noted that while most of the embodiments described herein are described as smart camera implementations, any of the techniques and features described may be used in either type of implementation, i.e., a computer/camera implementation or a smart camera implementation, as desired.

As FIG. 1B also shows, in preferred embodiments, the vision system (smart camera) may be operable to be coupled to an EtherCAT network 170, e.g., via an EtherCAT network interface that may be comprised in the chassis.

Figure 1C:
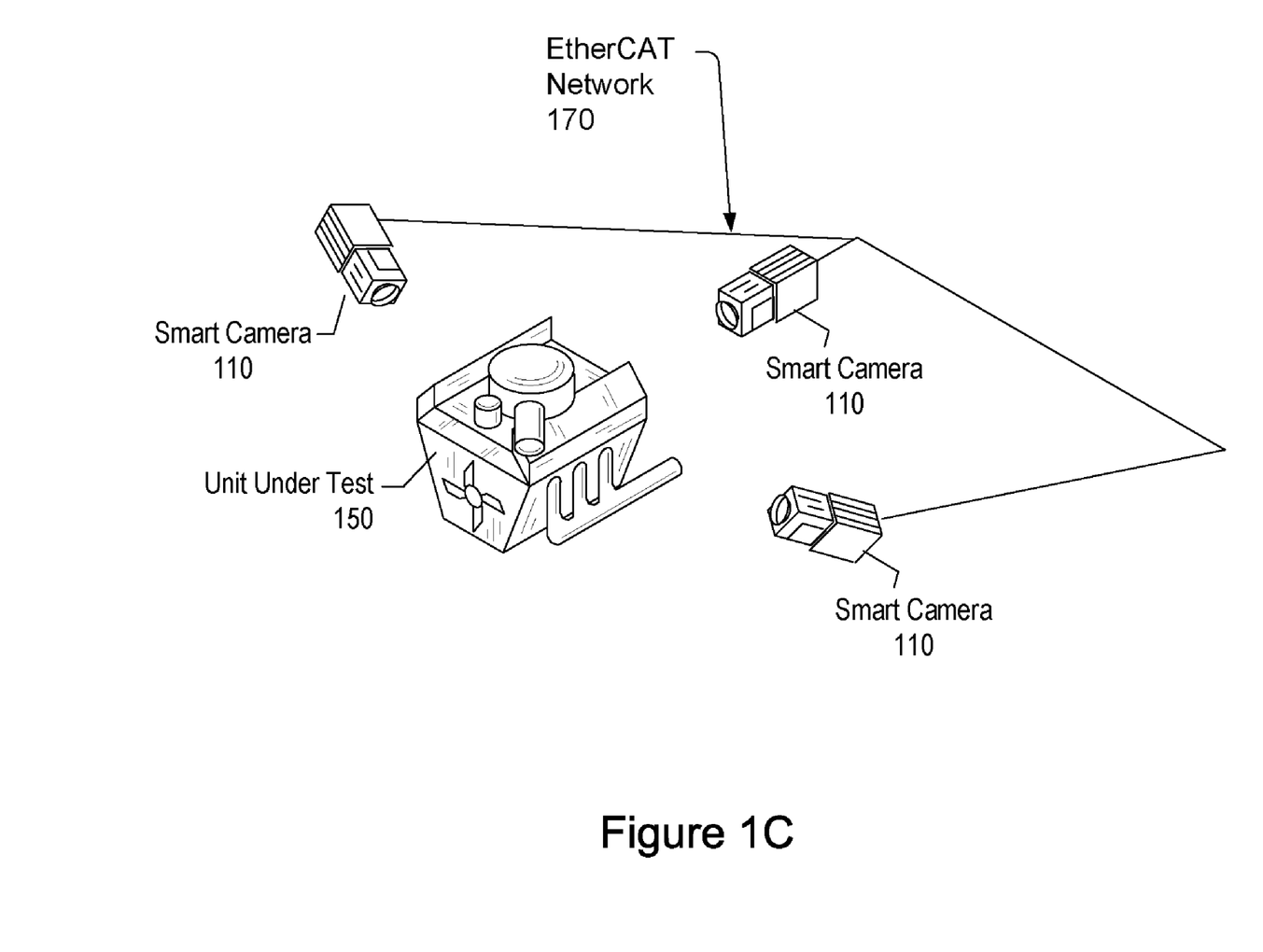
FIG. 1C illustrates multi-view vision system, according to one embodiment of the present invention.

FIG. 1C—Multi-View Vision System

FIG. 1C illustrates an exemplary multi-view vision system, according to one embodiment. In this exemplary embodiment, a plurality of vision systems are coupled via an EtherCAT network 170, where each of the vision systems is a smart camera 110 (see, e.g., FIG. 1B). As may be seen, each smart camera is positioned to acquire images of a unit under test (UUT) 150 from a respective view, i.e., position and angle, and thus, collectively provide multiple views of the UUT.

As noted above, in some embodiments, one of the vision systems may operate as an EtherCAT master device, while the other vision systems may operate as EtherCAT slave devices, where the slave devices may receive commands from the EtherCAT master device, and publish vision or image data on the EtherCAT network, e.g., for use by the EtherCAT master device.

In other embodiments, the EtherCAT master device may not be one of the vision systems, but may direct operation of the vision systems and/or other EtherCAT devices on the network.

In one embodiment, the plurality of vision systems may be synchronized using an EtherCAT distributed clock technique, in accordance with the EtherCAT specification. In one embodiment, the plurality of vision systems may be synchronized with a jitter less than or equal to 1 microsecond. In another embodiment, the plurality of vision systems may be configured to operate synchronously, and may be further configured to be time-based triggered via the EtherCAT network, e.g., according to a specified schedule or time with a jitter less than or equal to 1 microsecond. In some embodiments, the plurality of vision systems may be operable to be event triggered via the EtherCAT network, e.g., with a latency of 10 microseconds or less, i.e., in response to some specified event or interrupt.

In other embodiments, other synchronization and triggering techniques may be used as desired, commensurate with the EtherCAT protocol.

As mentioned above, in some embodiments, a first vision system may be or include an EtherCAT master device, each of one or more additional vision systems may be or include a respective EtherCAT slave device. The plurality of vision systems may implement a multi-view vision application or perform collaborative processing with respect to a target object, e.g., UT 150, where each of the one or more additional vision systems is operable to send vision data to the EtherCAT master device. Note that in various embodiments of the multi-view application or collaborative processing system, any of the above synchronization and triggering techniques may be used as desired, among others.

Figure 1D:
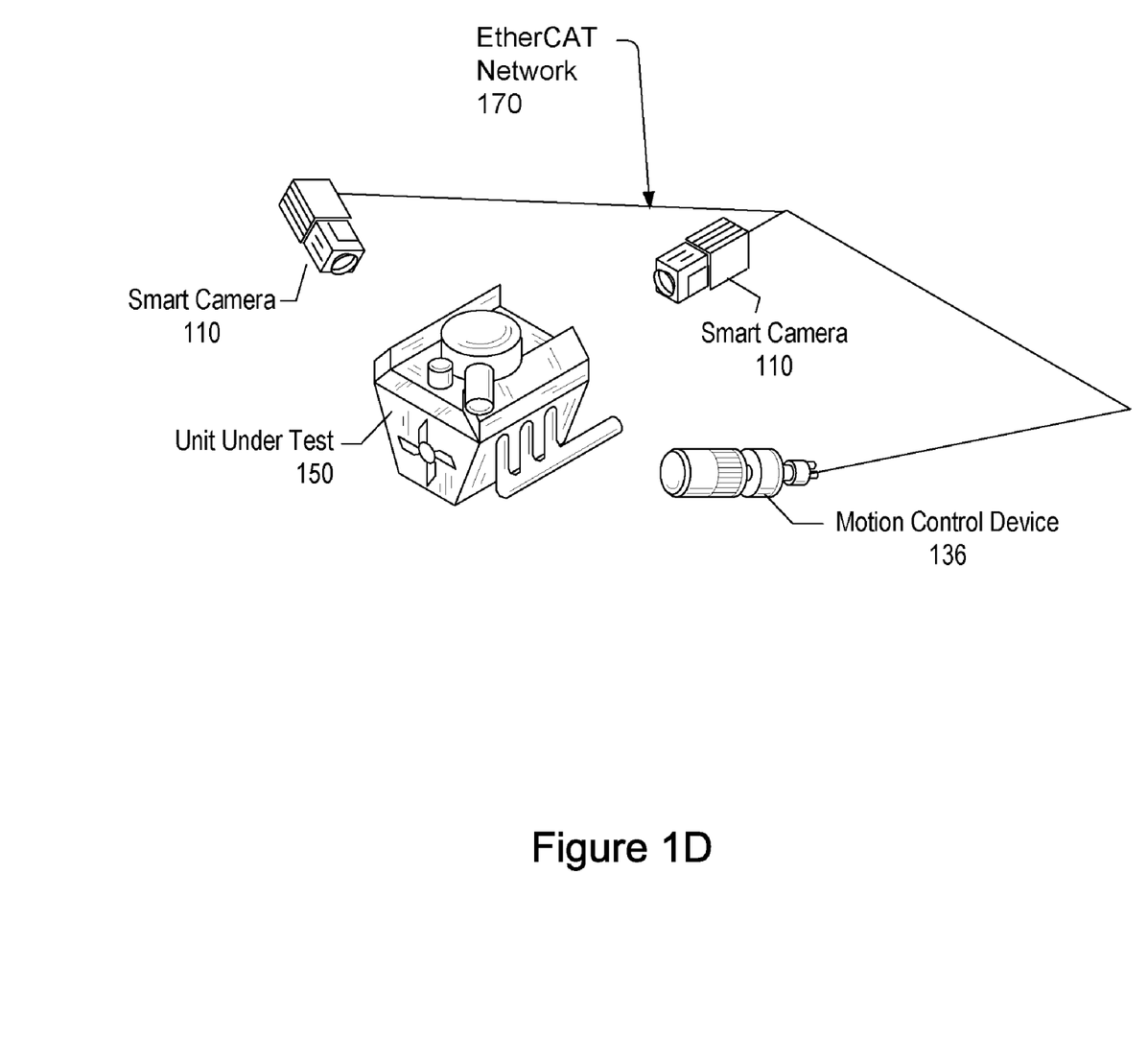
FIG. 1D illustrate a multi-view vision system with motion control, according to one embodiment of the present invention.

FIG. 1D—Vision/Control System

In some embodiments, a vision system may be coupled to at least one EtherCAT control device via the EtherCAT network. The vision system may be operable to send data on the EtherCAT network for use by the at least one EtherCAT control device to perform a control or I/O function. For example, in one embodiment, the vision system may be operable to send vision data to an EtherCAT master device (possibly another vision system, or even itself), where the EtherCAT master device may be operable to generate control data based on the received vision data, and send the control data to the at least one EtherCAT control device to perform a control function.

FIG. 1D illustrates an exemplary vision/motion control system where two smart cameras 110 and a motion control device 136 are all coupled via an EtherCAT network 170. Note that the system of FIG. 1D is meant to be exemplary only, and is not intended to accurately specify a real system—note that the motion control device 136 is not shown actually connected to the UUT 150. Rather, the system of FIG. 1D is meant to suggest major components of such a system. Similarly, the UUT 150 is meant to be exemplary only, and is not intended to limit the objects under consideration to any particular type or number.

The smart cameras 110 may be operable to acquire images of an object of interest, e.g., UT 150, and an EtherCAT master device, e.g., one of the smart cameras configured as a master, may generate motion control data, e.g., commands, based on the acquired images. For example, in some embodiments, each of the smart cameras may acquire the images, and perform image analysis to generate vision data, which may be sent to the EtherCAT master device, which may perform additional analysis, and generate the motion control data. The EtherCAT master device may then send the motion control data to the motion control device to perform at least part of a motion control task.

In one embodiment, the system may include a vision system (or multiple vision systems) coupled to at least one EtherCAT motion control device via the EtherCAT network, wherein the vision system(s) may be operable to: determine motion control data based on information in the acquired images, deterministically send the motion control data to the at least one EtherCAT motion control device via the EtherCAT network to control the at least one EtherCAT motion control device to perform a portion of a motion control task, and repeat said acquiring, said determining, and said sending in an iterative manner to perform successive portions of the motion control task based on the information, thereby performing a visual servoing control loop. In one embodiment, the visual servoing control loop may be performed with a frequency of 1 KHz or higher.

Figure 2A:
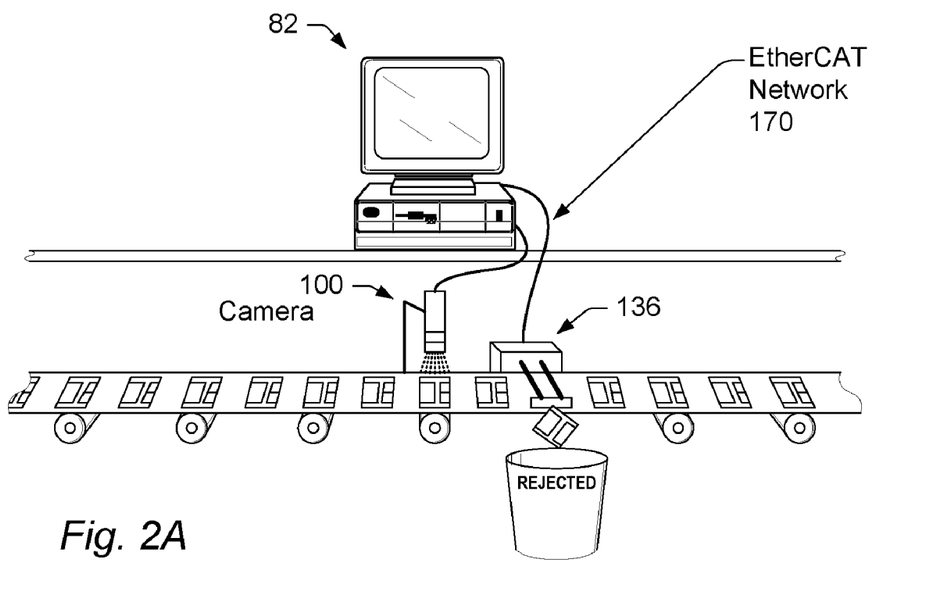
FIGS. 2A and 2B illustrate embodiments of an industrial motion control/vision system.
Figure 2B:
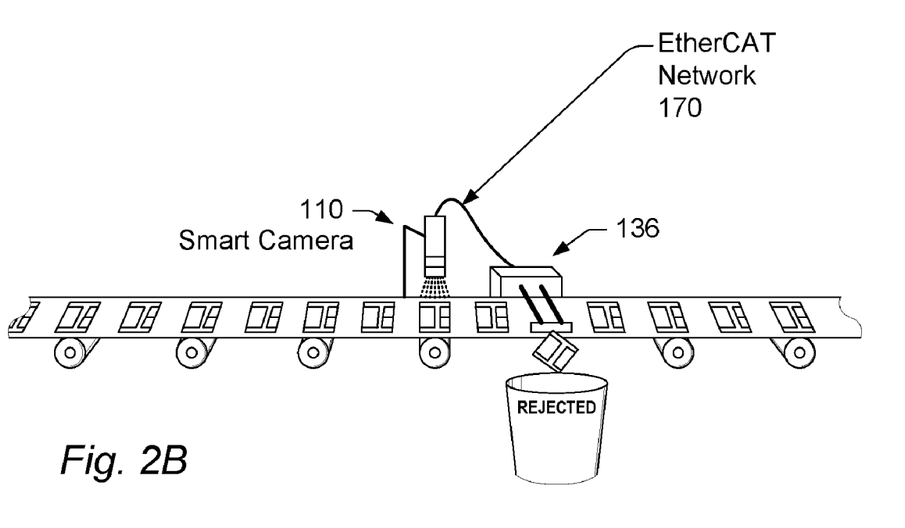

FIGS. 2A and 2B—Industrial Vision/Motion Control Systems

FIGS. 2A and 2B illustrate exemplary industrial vision control systems, each including a vision system and a control device 136 coupled via an EtherCAT network. As may be seen, the vision system of FIG. 2A includes a computer system 82 and a camera 100, whereas the vision system of FIG. 2B is a smart camera 110, i.e., a camera with an onboard processor/memory. As indicated in the figures, in these exemplary industrial applications, manufactured parts are conveyed past a camera (e.g., camera 100 or smart camera 110), which acquires an image of each part. Each image is analyzed (e.g., by the computer 82 or the smart camera 110), and a determination is made as to whether the part passes inspection. If not, commands are send to the control device to remove the part from the conveyor.

Thus, in one embodiment of the system of FIG. 2A, the camera 100 may acquire images and send them to the computer 82, which may perform image processing functionality, and determine control data to send to the control device 136 (or not, e.g., if the part passes the inspection). Similarly, in the embodiment of FIG. 2B, the processor in the smart camera 110 may perform all of the desired image processing function, including optionally performing an operation based on determined characteristics of the image, e.g., determining control data. Thus, in the embodiments of FIGS. 2A and 2B, the processor in the smart camera 110 or the computer system 82 may control the control device 136.

In an alternate embodiment, the control device 136 may also include a functional unit, e.g., a processor or programmable hardware element, and may operate as an EtherCAT master or slave device. For example, as a master device, the control device may receive vision data from the vision system and determine control data for itself. Examples of control functions include moving a part or object to be imaged by a camera, rejecting a part on an assembly line, or placing or affixing components on a part being assembled, or a robotics application, among others.

Figure 3:
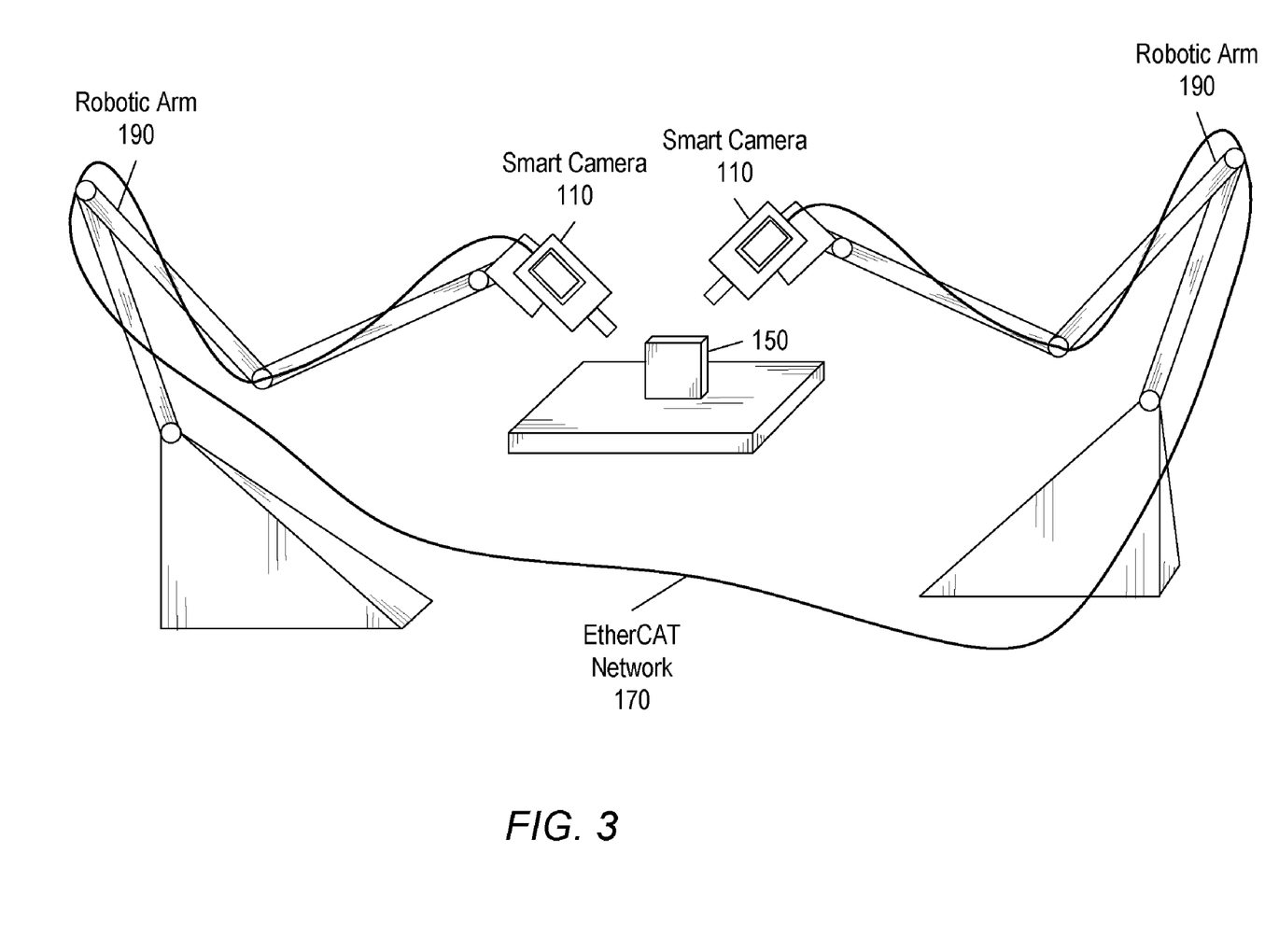
FIG. 3 illustrates an example application of the present invention in the field of robotics, according to one embodiment.

FIG. 3—Vision/Robotics Systems

FIG. 3 illustrates an example application of the present invention in the field of robotics. As FIG. 3 shows, the system includes two smart cameras 110 mounted on respective robotic arms 190, and coupled via an EtherCAT network. The smart cameras may be operable to acquire images of the UUT 150, and control the robotic arms 190 accordingly. For example, in one embodiment, one of the smart cameras may be configured as an EtherCAT master device. Each smart camera may acquire images and generate vision data based on the acquired images. The master camera may receive the vision data and generate motion control commands for the robotic arms, which may then move accordingly. In one embodiment, the smart cameras may utilize the robotic arms to acquire the images, i.e., to scan the object 150. For example, in one embodiment, the robotic arms may be used in tandem. In this case, a cooperative scanning strategy may be required which coordinates the movement of each arm 190 to collectively scan the object 150.

In some embodiments, the vision system may be coupled to at least one EtherCAT device via the EtherCAT network, where the vision system may be operable to send data on the EtherCAT network for use by the at least one EtherCAT device to perform a control function, e.g., for controlling a process, e.g., a valve in a chemical manufacturing process. For example, the system may include a plurality of vision systems, and an EtherCAT master device, each coupled to the EtherCAT network. Each of the plurality of vision systems may be operable to send vision data to the EtherCAT master device, and the EtherCAT master device may be operable to generate control data based on the received vision data, and send the control data to the at least one EtherCAT device to perform a control function.

In other embodiments, the vision system may be coupled to at least one EtherCAT device via the EtherCAT network, where the vision system may be operable to send data on the EtherCAT network for use by the at least one EtherCAT device to perform an I/O function, e.g., to generate or acquire a signal or data. For example, the system may include a plurality of vision systems, and an EtherCAT master device, each coupled to the EtherCAT network. Each of the plurality of vision systems may be operable to send vision data to the EtherCAT master device, and the EtherCAT master device may be operable to generate I/O data based on the received vision data, and send the I/O data to the at least one EtherCAT device to perform an I/O function.

In one embodiment, the system may include a plurality of vision systems, each including a camera, a processor and memory, coupled to the camera, and a network interface, coupled to the processor and memory, and operable to couple to a network. A first vision system of the plurality of vision systems may be or include a master device, and others of the plurality of vision systems may be or include slave devices. The master device may be operable to place a frame on the network, where the frame includes data addressed to each of one or more of the slave devices. Each slave device may be operable to read the data addressed to the slave device and write data to the frame while the frame passes through the slave device. In preferred embodiments, the network is an EtherCAT network. Correspondingly, in preferred embodiments, the vision systems are EtherCAT enabled.

Various methods using vision systems such as those described above are described below.

Figure 4:
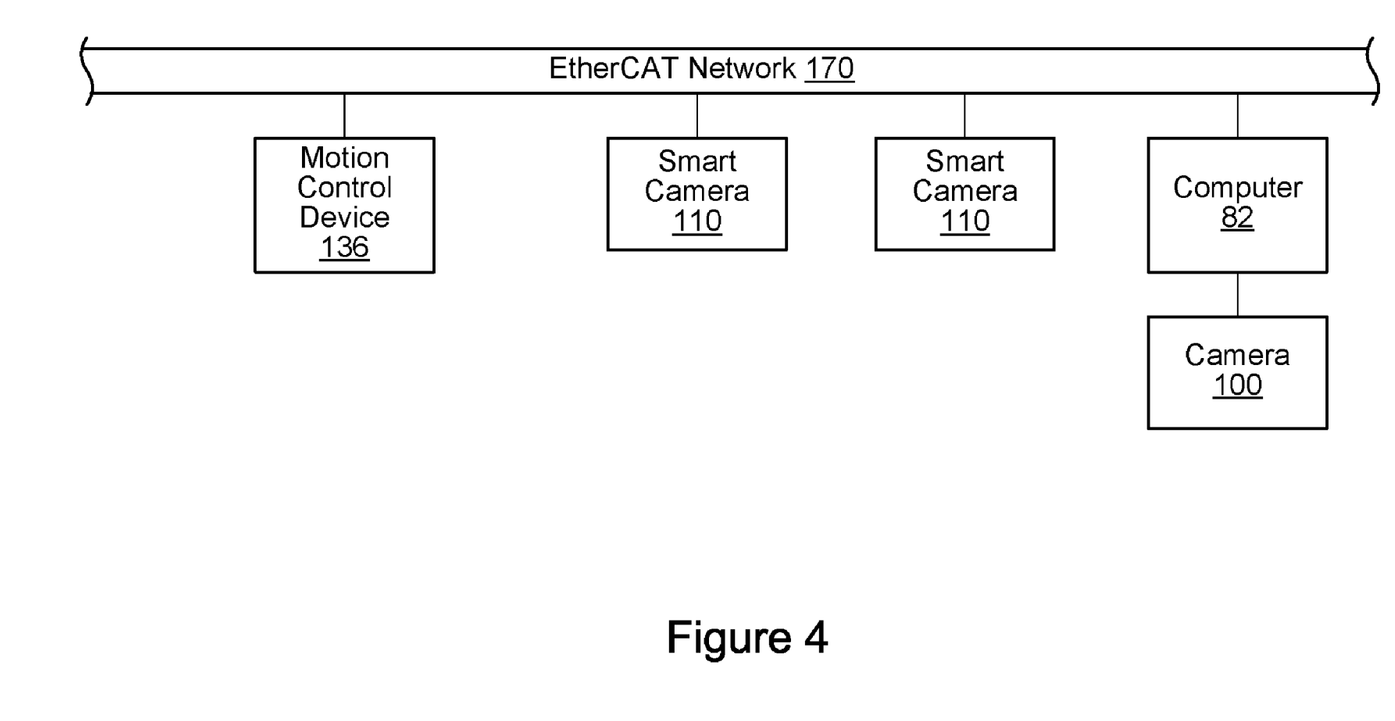
FIG. 4 is an exemplary block diagram of a multi-view vision system with motion control, according to one embodiment.

FIG. 4—Block Diagram of Vision/Control System

FIG. 4 is a high-level block diagram of an exemplary multi-view vision/control system, according to one embodiment. As indicated, this embodiment includes an EtherCAT network to which are communicatively coupled a motion control device 136, two smart cameras 110, and a vision system that includes a computer 82 and a camera 100. In various embodiments, the motion control device 136, the smart cameras 110, and the computer-based vision system may be configured as EtherCAT master or slave as desired, and may operate collectively to perform a vision/control task or operation. It should be noted that the computer system 82 may be a general-purpose computer system, a computer implemented on a card installed in a chassis, or any other type of computer, e.g., a personal digital assistant (PDA), laptop, etc., as desired. It should also be noted that in other embodiments, other control systems may be used, e.g., control systems not directed to motion, e.g., for communications control, etc. In other words, motion control is but one exemplary type of control contemplated for embodiments of the present invention.

Figure 5:
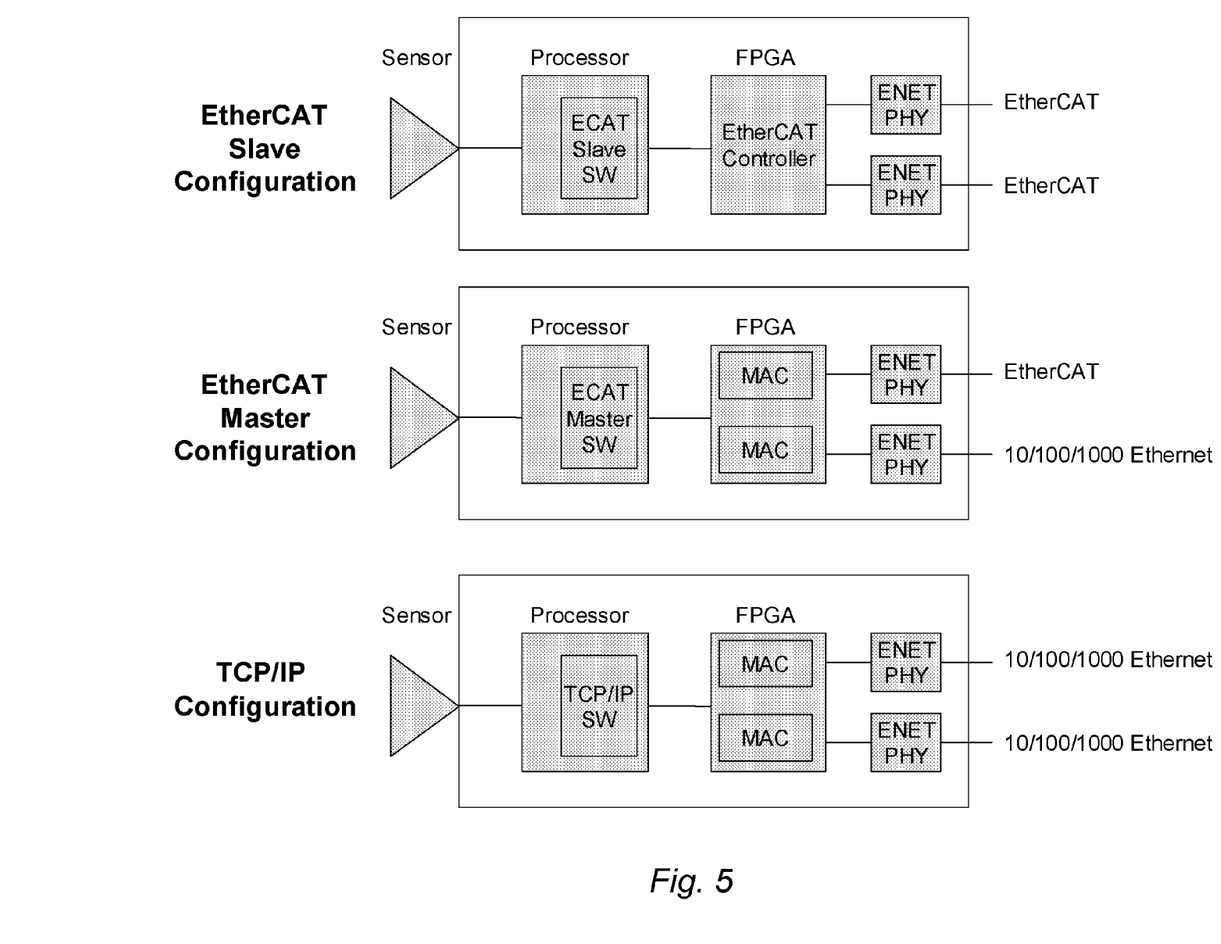
FIG. 5 illustrates block diagrams of exemplary smart cameras, according to various embodiments.

FIG. 5—Embodiments of Smart Cameras

FIG. 5 illustrates block diagrams of exemplary smart cameras, according to various embodiments of the invention. More specifically, FIG. 5 illustrates exemplary configurations of smart cameras configured to operate in various modes, specifically, as an EtherCAT slave device (top diagram), an EtherCAT master device (middle diagram), and a standard Ethernet TCP/IP device (bottom diagram).

As FIG. 5 shows in the top diagram, in one embodiment, an EtherCAT slave configuration of a smart camera may include a sensor (camera), a processor (with memory) that may execute EtherCAT slave software, as well as an EtherCAT controller, and two network interfaces, labeled ENET PHY (physical layer), i.e., one per network port, for communicating via an EtherCAT network. In this slave embodiment, the EtherCAT controller is implemented in hardware, specifically, and FPGA, although in other embodiments, an ASIC may be used. Note, however, that any other implementations of the components shown may be used as desired.

Per the middle diagram of FIG. 5, in one embodiment, an EtherCAT master configuration of a smart camera may include a sensor (camera), a processor (with memory) that may execute EtherCAT master software, as well as two MAC interfaces (media access control layer), and two network interfaces, labeled ENET PHY (physical layer), i.e., one per network port, for communicating via an EtherCAT network and a 10/100/1000 Ethernet network, respectively. In this master embodiment, the MACs are implemented in hardware, specifically, an FPGA, although in other embodiments, an ASIC or other hardware implementation may be used. Alternatively, the MACs may be integrated in the processor. Any other implementations of the components shown may be used as desired.

Per the bottom diagram of FIG. 5, in one embodiment, an Ethernet TCP/IP configuration of a smart camera may include a sensor (camera), a processor (with memory) that may execute TCP/IP software, as well as two MAC interfaces (media access control layer), and two network interfaces, labeled ENET PHY (physical layer), i.e., one per network port, for communicating via a 10/100/1000 Ethernet network, as shown. In this master embodiment, the MACs are implemented in hardware, specifically, an FPGA, although in other embodiments, an ASIC or other hardware implementation may be used. Alternatively, the MACs may be integrated in the processor. Any other implementations of the components shown may be used as desired.

Note that the configurations shown are meant to be exemplary only, and are not intended to limit the vision system to any particular implementation.

Figure 6:
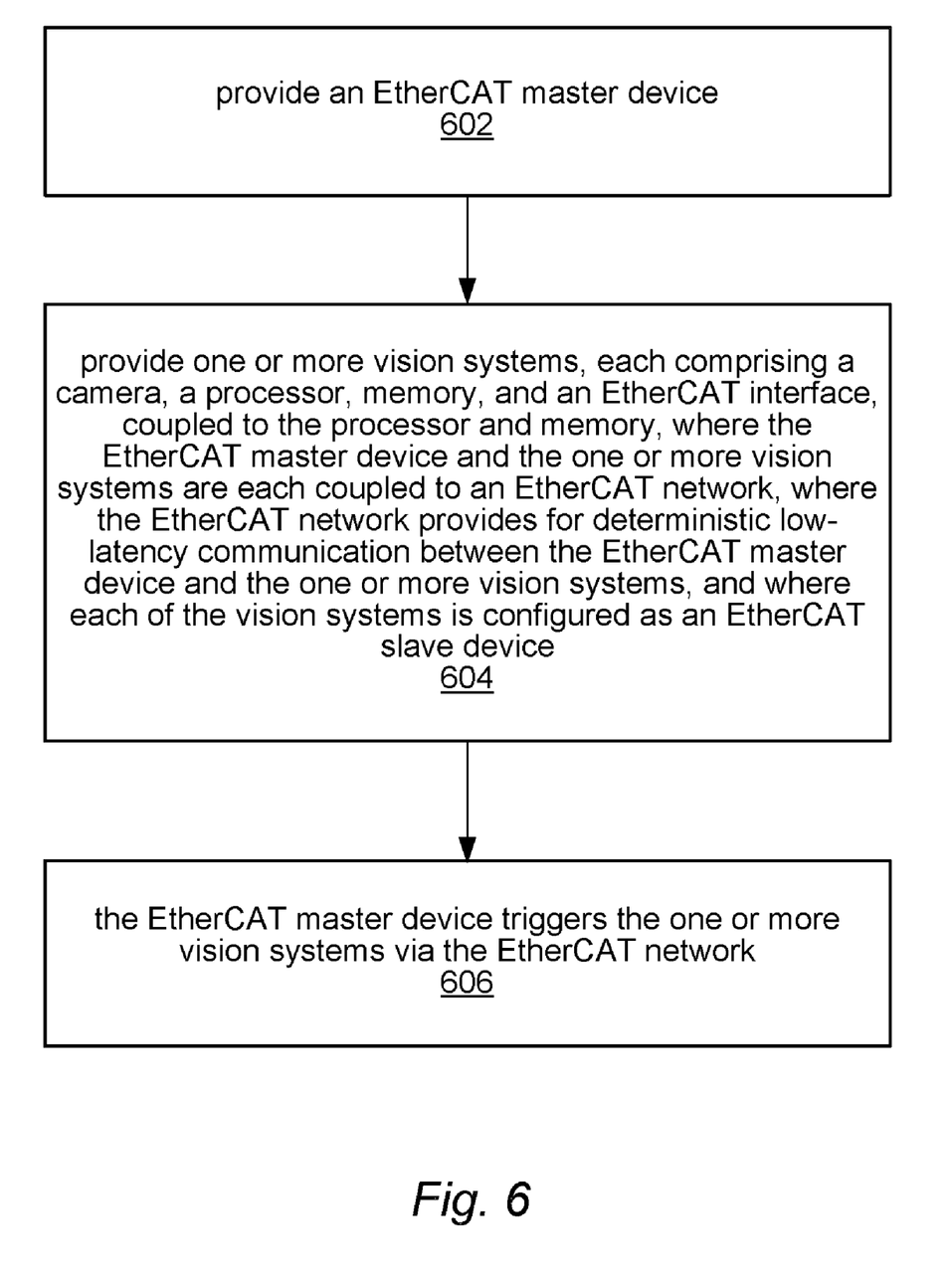
FIG. 6 is a flowchart diagram illustrating one embodiment of a method for deterministic low-latency triggering of a vision system.

FIG. 6—Flowchart of a Method for Deterministic Low-Latency Triggering of a Vision System FIG. 6 illustrates embodiments of a method for deterministic low-latency triggering of a vision system, according to one embodiment. The method shown in FIG. 6 may be used in conjunction with any of the computer systems or devices shown in the above Figures, among others. In various embodiments, some of the method elements shown may be performed concurrently, in a different order than shown, or may be omitted. Additional method elements may also be performed as desired. As shown, this method may operate as follows.

First, in 602, an EtherCAT master device may be provided. The EtherCAT master device may be implemented in accordance with any of the embodiments described above, e.g., as a vision system, comprising a camera, a processor and memory, and an EtherCAT interface. If the EtherCAT master device is implemented as a vision system, the device may be a computer/camera implementation, as described above with reference to FIG. 1A, or a smart camera implementation, as described above with reference to FIG. 1C and FIG. 5 (middle diagram), among others.

In 604, one or more vision systems may be provided, each comprising a camera, a processor, memory, and an EtherCAT interface, coupled to the processor and memory, wherein the EtherCAT master device and the one or more vision systems are each coupled to an EtherCAT network, wherein the EtherCAT network provides for deterministic low-latency communication between the EtherCAT master device and the one or more vision systems, and where each of the vision systems is configured as an EtherCAT slave device.

As with the master device, in various embodiments, the EtherCAT slave device may be implemented in accordance with any of the embodiments described above. For example, each slave device may be a computer/camera implementation, as described above with reference to FIG. 1A, or a smart camera implementation, as described above with reference to FIG. 1C and FIG. 5 (top diagram), among others.

In 606, the EtherCAT master device may trigger the one or more vision systems via the EtherCAT network. As described above, in various embodiments, the vision systems may be time-based triggered via the EtherCAT network, e.g., according to a specified schedule or time with a jitter less than or equal to 1 microsecond, and/or may be event triggered via the EtherCAT network, e.g., with a latency of 10 microseconds or less, i.e., in response to some specified event or interrupt.

Thus, various embodiments of the above system and method may facilitate deterministic low-latency triggering of a vision system.

Figure 7:
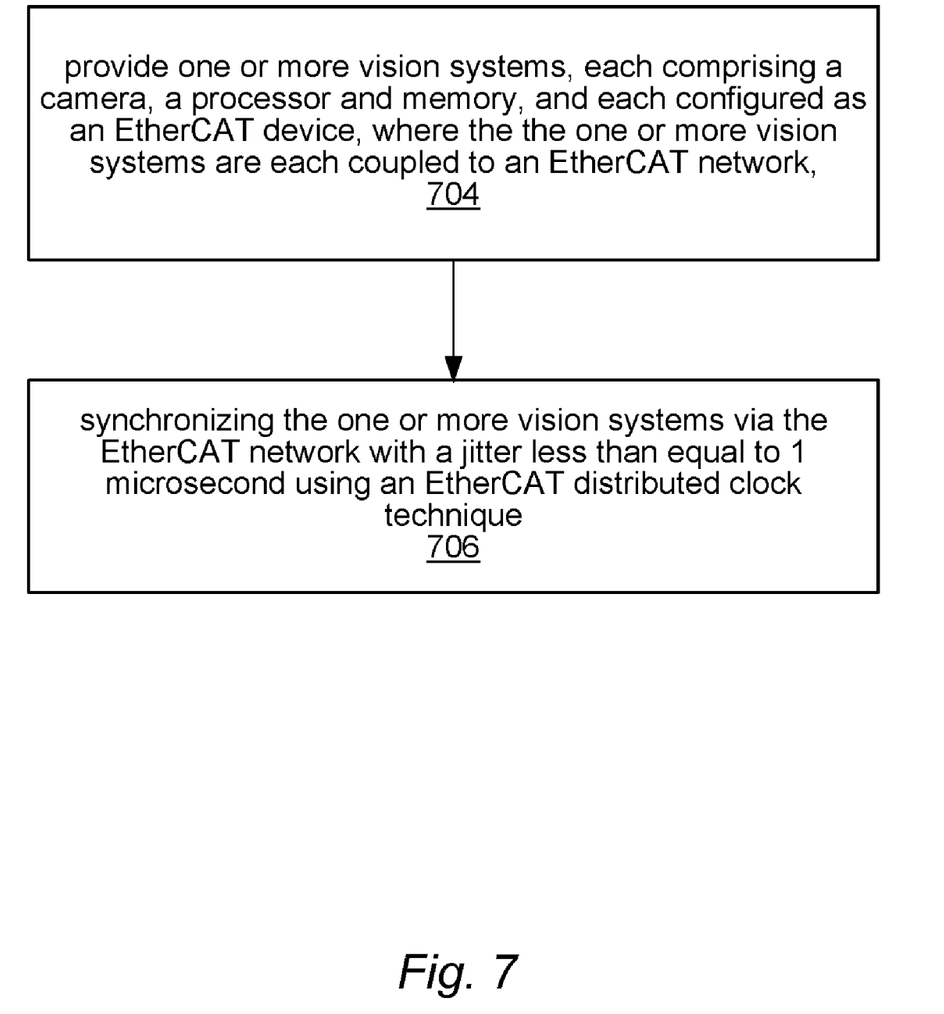
FIG. 7 is a flowchart diagram illustrating one embodiment of a method for deterministic low-latency synchronization of a vision system.

FIG. 7—Flowchart of a Method for Deterministic Low-Latency Synchronization of a Vision System FIG. 7 illustrates embodiments of a method for deterministic low-latency synchronization of a vision system, according to one embodiment. The method shown in FIG. 7 may be used in conjunction with any of the computer systems or devices shown in the above Figures, among others. In various embodiments, some of the method elements shown may be performed concurrently, in a different order than shown, or may be omitted. Additional method elements may also be performed as desired. As shown, this method may operate as follows.

First, in 702, one or more vision systems may be provided, each comprising a camera, a processor, and memory, and each configured as an EtherCAT device, where the one or more vision systems are each coupled to an EtherCAT network. In various embodiments, each of the one or more vision systems may be implemented in accordance with any of the embodiments described above. For example, each vision system may be a computer/camera implementation, as described above with reference to FIG. 1A, or a smart camera implementation, as described above with reference to FIG. 1C and FIG. 5, among others.

In 704, the one or more vision systems may be synchronized via the EtherCAT network, with a jitter less than equal to 1 microsecond using an EtherCAT distributed clock technique.

Thus, various embodiments of the above system and method may facilitate deterministic low-latency synchronization of a vision system.

Figure 8:
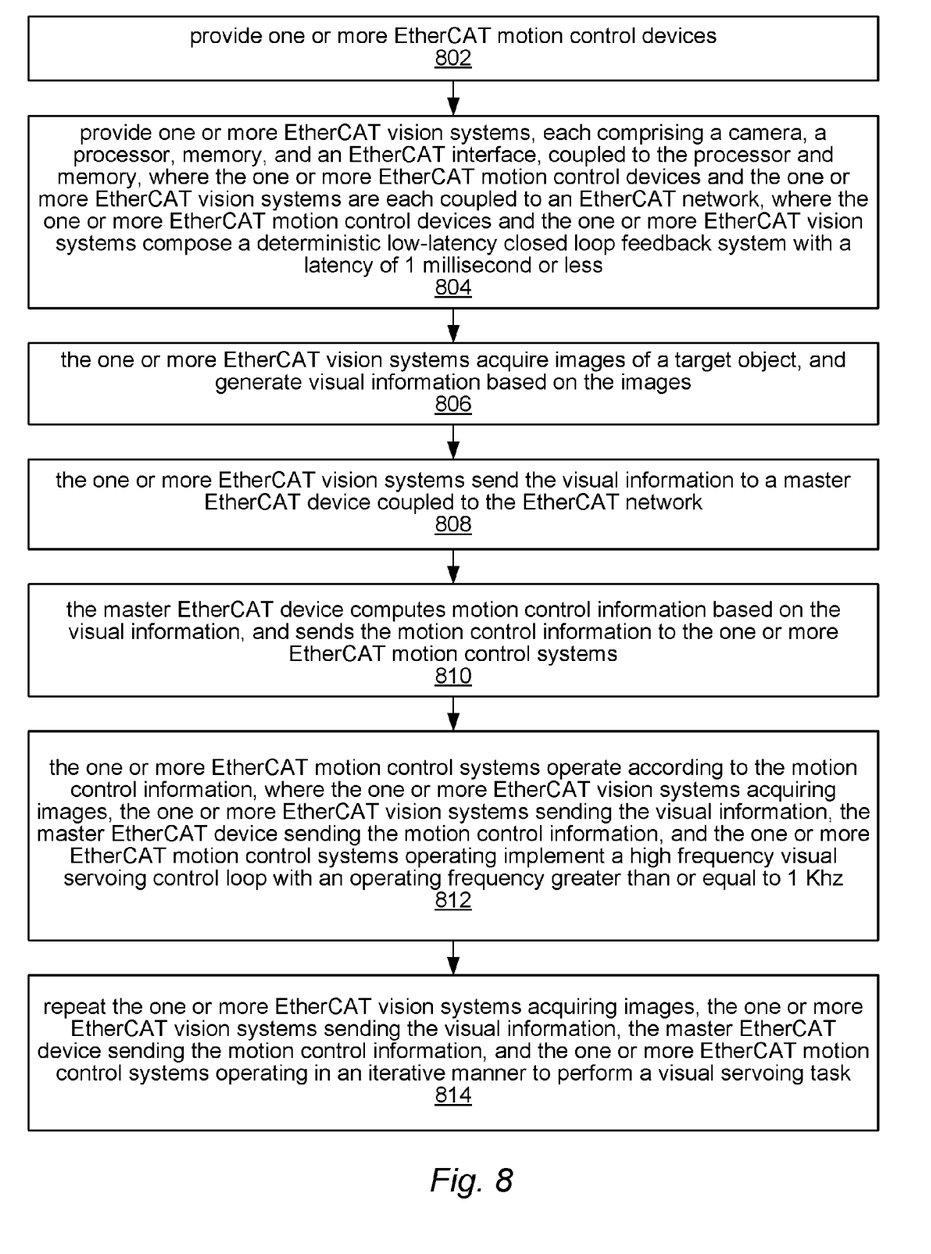
FIG. 8 is a flowchart diagram illustrating one embodiment of a method for deterministic low-latency visual servoing.

FIG. 8—Flowchart of a Method for Deterministic Low-Latency Visual Servoing

FIG. 8 illustrates embodiments of a method for deterministic low-latency visual servoing, according to one embodiment. The method shown in FIG. 8 may be used in conjunction with any of the computer systems or devices shown in the above Figures, among others. In various embodiments, some of the method elements shown may be performed concurrently, in a different order than shown, or may be omitted. Additional method elements may also be performed as desired. As shown, this method may operate as follows.

First, in 802, one or more EtherCAT motion control devices may be provided. The one or more EtherCAT motion control devices may each include an EtherCAT interface for communicating via an EtherCAT network.

In 804, one or more EtherCAT vision systems may be provided, each comprising a camera, a processor, memory, and an EtherCAT interface, coupled to the processor and memory, wherein the one or more EtherCAT motion control devices and the one or more vision systems are each coupled to an EtherCAT network, thereby composing a deterministic low-latency closed loop feedback system with a latency of 1 millisecond or less.

As mentioned above, in various embodiments, the EtherCAT vision systems may be implemented in accordance with any of the embodiments described above, e.g., a computer/camera implementation, as described above with reference to FIG. 1A, or a smart camera implementation, as described above with reference to FIG. 1C and FIG. 5, among others.

In 806, the one or more EtherCAT vision systems may acquire images of a target object, and generate visual information based on the images. For example, the EtherCAT vision systems may analyze the acquired images using any of various image processing algorithms, e.g., edge detection, pattern recognition, transformations, filtering, and so forth, to generate visual information derived from or characterizing the target object.

In 808, the one or more EtherCAT vision systems may send the visual information to a master EtherCAT device coupled to the EtherCAT network, i.e., via the EtherCAT network.

In 810, the master EtherCAT device may compute motion control information based on the visual information, and send the motion control information to the one or more EtherCAT motion control systems, i.e., via athe EtherCAT network. For example, the motion control information may specify actuator movements, target positions, etc., for one or more motion control systems.

In 812, the one or more EtherCAT motion control systems may operate according to the motion control information, i.e., performing at least a portion of a visual servoing task or operation, wherein said one or more EtherCAT vision systems acquiring images, said one or more EtherCAT vision systems sending the visual information, said master EtherCAT device sending the motion control information, and said one or more EtherCAT motion control systems operating implement a high frequency visual servoing control loop with an operating frequency greater than or equal to 1 Khz.

In 814, the above one or more EtherCAT vision systems acquiring images, said one or more EtherCAT vision systems sending the visual information, said master EtherCAT device sending the motion control information, and said one or more EtherCAT motion control systems operating may be repeated in iterative manner to perform a visual servoing task.

Thus, various embodiments of the above system and method may implement a deterministic low-latency visual servoing system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system, comprising:
   a vision system, comprising:
      a camera;
      a processor and memory, coupled to the camera;
      a deterministic low-latency Ethernet-based network interface, coupled to the processor and memory, and operable to couple to a deterministic low-latency Ethernet-based network; and
   at least one deterministic low-latency Ethernet-based motion control device, coupled to the vision system via the deterministic low-latency Ethernet-based network;
   wherein the deterministic low-latency Ethernet-based network provides for deterministic low-latency communication between the vision system and devices coupled to the deterministic low-latency Ethernet-based network;
wherein the vision system is operable to:
acquire images;
determine motion control data based on information in the acquired images;
deterministically send the motion control data to the at least one deterministic low-latency Ethernet-based motion control device via the deterministic low-latency Ethernet-based network to control the at least one deterministic low-latency Ethernet-based motion control device to perform a portion of a motion control task; and
repeat said acquiring, said determining, and said sending in an iterative manner to perform successive portions of the motion control task based on the information, thereby performing a visual servoing control loop with a frequency of 1 KHz or higher.

2. The system of claim 1, wherein the vision system is a deterministic low-latency Ethernet-based slave device.

3. The system of claim 1, wherein the vision system is a deterministic low-latency Ethernet-based master device.

4. The system of claim 1, wherein the vision system is configurable to operate as any of:
a deterministic low-latency Ethernet-based master device;
a deterministic low-latency Ethernet-based slave device; or
a TCP/IP Ethernet device.

5. The system of claim 1, further comprising:
one or more additional vision systems, coupled to the deterministic low-latency Ethernet-based network;
wherein the vision system and the one or more additional vision systems compose a plurality of vision systems, and wherein the plurality of vision systems are synchronized using a deterministic low-latency Ethernet-based distributed clock technique.

6. The system of claim 5, wherein the plurality of vision systems are operable to be time-based triggered via the deterministic low-latency Ethernet-based network.

7. The system of claim 6, further comprising:
wherein the vision system comprises a deterministic low-latency Ethernet-based master device, and each of the one or more additional vision systems comprises a respective deterministic low-latency Ethernet-based slave device, and wherein the plurality of vision systems implement a multi-view vision application with respect to a target object, wherein each of the one or more additional vision systems is operable to send vision data to the deterministic low-latency Ethernet-based master device via the deterministic low-latency Ethernet-based network.

8. The system of claim 6, further comprising:
wherein the vision system comprises a deterministic low-latency Ethernet-based master device, and each of the one or more additional vision systems comprises a respective deterministic low-latency Ethernet-based slave device, and wherein the plurality of vision systems are operable to perform collaborative processing with respect to a target object, wherein each of the one or more additional vision systems is operable to send vision data to the deterministic low-latency Ethernet-based master device via the deterministic low-latency Ethernet-based network.

9. The system of claim 1, further comprising:
one or more additional vision systems, coupled to the deterministic low-latency Ethernet-based network;
wherein the vision system and the one or more additional vision systems compose a plurality of vision systems, and wherein the plurality of vision systems are operable to be event triggered via the deterministic low-latency Ethernet-based network.

10. The system of claim 9, further comprising:
wherein the vision system comprises a deterministic low-latency Ethernet-based master device, and each of the one or more additional vision systems comprises a respective deterministic low-latency Ethernet-based slave device, and wherein the plurality of vision systems implement a multi-view vision application with respect to a target object, wherein each of the one or more additional vision systems is operable to send vision data to the deterministic low-latency Ethernet-based master device via the deterministic low-latency Ethernet-based network.

11. The system of claim 9, further comprising:
wherein the vision system comprises a deterministic low-latency Ethernet-based master device, and each of the one or more additional vision systems comprises a respective deterministic low-latency Ethernet-based slave device, and wherein the plurality of vision systems is operable to perform collaborative processing with respect to a target object, wherein each of the one or more additional vision systems is operable to send vision data to the deterministic low-latency Ethernet-based master device via the deterministic low-latency Ethernet-based network.

12. The system of claim 1, further comprising:
at least one deterministic low-latency Ethernet-based device, coupled to the vision system via the deterministic low-latency Ethernet-based network;
wherein the vision system is operable to send data on the deterministic low-latency Ethernet-based network for use by the at least one deterministic low-latency Ethernet-based device to perform a control function.

13. The system of claim 12, further comprising:
a deterministic low-latency Ethernet-based master device, coupled to the deterministic low-latency Ethernet-based network; and
one or more additional vision systems, coupled to the deterministic low-latency Ethernet-based network;
wherein the vision system and the one or more additional vision systems compose a plurality of vision systems, and wherein each of the plurality of vision systems is operable to send vision data to the deterministic low-latency Ethernet-based master device, wherein the deterministic low-latency Ethernet-based master device is operable to generate control data based on the received vision data, and send the control data to the at least one deterministic low-latency Ethernet-based device to perform a control function.

14. The system of claim 1, further comprising:
at least one deterministic low-latency Ethernet-based device, coupled to the vision system via the deterministic low-latency Ethernet-based network;
wherein the vision system is operable to send data on the deterministic low-latency Ethernet-based network for use by the at least one deterministic low-latency Ethernet-based device to perform an I/O function.

15. The system of claim 1,
wherein the a vision system comprises a smart camera, comprising:
the camera;
the processor and memory;
the deterministic low-latency Ethernet-based interface; and a chassis, containing the camera, the processor and memory, and the deterministic low-latency Ethernet-based interface.

16. The system of claim 1, wherein the deterministic low-latency Ethernet-based network comprises an Ethernet-based fieldbus network.

17. A method, comprising:

providing one or more deterministic low-latency Ethernet-based motion control systems, each comprising a deterministic low-latency Ethernet-based interface;

providing one or more deterministic low-latency Ethernet-based vision systems, each comprising a camera, a processor and memory, and a deterministic low-latency Ethernet-based interface, wherein the one or more deterministic low-latency Ethernet-based motion control systems and the one or more deterministic low-latency Ethernet-based vision systems are coupled to a deterministic low-latency Ethernet-based network, composing a deterministic low latency closed loop feedback system, wherein the latency is less than or equal to 1 millisecond;

the one or more deterministic low-latency Ethernet-based vision systems acquiring images of a target object, and generating visual information based on the images;

the one or more deterministic low-latency Ethernet-based vision systems sending the visual information to a master deterministic low-latency Ethernet-based device coupled to the deterministic low-latency Ethernet-based network;

the master deterministic low-latency Ethernet-based device computing motion control information based on the visual information, and sending the motion control information to the one or more deterministic low-latency Ethernet-based motion control systems; and the one or more deterministic low-latency Ethernet-based motion control systems operating according to the motion control information;

wherein said one or more deterministic low-latency Ethernet-based vision systems acquiring images, said one or more deterministic low-latency Ethernet-based vision systems sending the visual information, said master deterministic low-latency Ethernet-based device sending the motion control information, and said one or more deterministic low-latency Ethernet-based motion control systems operating implement a high frequency visual servoing control loop with an operating frequency greater than or equal to 1 Khz; and repeating said one or more deterministic low-latency Ethernet-based vision systems acquiring images, said one or more deterministic low-latency Ethernet-based vision systems sending the visual information, said master deterministic low-latency Ethernet-based device sending the motion control information, and said one or more deterministic low-latency Ethernet-based motion control systems operating in an iterative manner, to perform a visual servoing task.

18. The method of claim 17, further comprising:

synchronizing the one or more deterministic low-latency Ethernet-based vision systems using a deterministic low-latency Ethernet-based distributed clock technique.

19. The method of claim 17, wherein the deterministic low-latency Ethernet-based network comprises an Ethernet-based fieldbus network.

* * * * *